United States Patent
Creamer et al.

(10) Patent No.: US 11,292,992 B2
(45) Date of Patent: Apr. 5, 2022

(54) GRADIENT COPOLYMERS FOR USE IN AUTOMATIC DISHWASHING SYSTEMS

(71) Applicants: Dow Global Technologies LLC, Midland, MI (US); Rohm and Haas Company, Collegeville, PA (US)

(72) Inventors: Marianne Creamer, Warrington, PA (US); Severine Ferrieux, Valbonne (FR); Eric Wasserman, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 78 days.

(21) Appl. No.: 16/753,908

(22) PCT Filed: Oct. 9, 2018

(86) PCT No.: PCT/US2018/054968
§ 371 (c)(1),
(2) Date: Apr. 6, 2020

(87) PCT Pub. No.: WO2019/083718
PCT Pub. Date: May 2, 2019

(65) Prior Publication Data
US 2020/0263111 A1 Aug. 20, 2020

Related U.S. Application Data

(60) Provisional application No. 62/575,678, filed on Oct. 23, 2017.

(51) Int. Cl.
| | |
|---|---|
| C11D 3/37 | (2006.01) |
| C11D 7/26 | (2006.01) |
| C11D 7/34 | (2006.01) |
| C08F 220/06 | (2006.01) |
| C11D 1/66 | (2006.01) |
| C11D 3/08 | (2006.01) |
| C11D 3/10 | (2006.01) |
| C11D 3/20 | (2006.01) |
| C11D 3/36 | (2006.01) |
| C11D 3/39 | (2006.01) |
| C11D 11/00 | (2006.01) |

(52) U.S. Cl.
CPC ............ *C11D 3/378* (2013.01); *C08F 220/06* (2013.01); *C11D 1/66* (2013.01); *C11D 3/08* (2013.01); *C11D 3/10* (2013.01); *C11D 3/2086* (2013.01); *C11D 3/361* (2013.01); *C11D 3/3757* (2013.01); *C11D 3/3788* (2013.01); *C11D 3/3942* (2013.01); *C11D 7/26* (2013.01); *C11D 7/265* (2013.01); *C11D 11/0023* (2013.01)

(58) Field of Classification Search
CPC ....... C11D 3/3757; C11D 3/3788; C11D 7/26; C11D 7/265
USPC .......................... 510/475, 499, 505
See application file for complete search history.

(56) References Cited

U.S. PATENT DOCUMENTS

| 8,680,033 B2 | 3/2014 | Creamer et al. | |
| 2009/0186794 A1* | 7/2009 | Chang | C11D 3/3784 510/218 |
| 2015/0275141 A1* | 10/2015 | Luneau | C08F 293/00 510/228 |

FOREIGN PATENT DOCUMENTS

| CN | 101362811 | 2/2009 |
| CN | 102284247 | 12/2011 |
| EP | 2228428 B1 | 1/2013 |
| EP | 2896637 | 7/2015 |
| WO | 2015042026 | 3/2015 |
| WO | 2017013158 | 1/2017 |
| WO | 2017036969 | 3/2017 |

* cited by examiner

*Primary Examiner* — Gregory R Delcotto
(74) *Attorney, Agent, or Firm* — Kenneth Crimaldi

(57) ABSTRACT

A polymer comprising a first fraction and a second fraction, wherein the first fraction comprises from 90 to 100 wt % polymerized $C_3$-$C_6$ carboxylic acid monomer units; and the second fraction comprises from 30 to 80 wt % polymerized $C_3$-$C_6$ carboxylic acid monomer units and from 20 to 70 wt % polymerized sulfonic acid monomer units; wherein the first fraction is from 10 to 40 wt % of the polymer and the second fraction is from 60 to 90 wt % of the polymer; the polymer has $M_w$ from 3,000 to 30,000; and monomers are randomly distributed within each fraction.

6 Claims, No Drawings

GRADIENT COPOLYMERS FOR USE IN AUTOMATIC DISHWASHING SYSTEMS

BACKGROUND

This invention relates generally to a gradient copolymer useful as an additive in automatic dishwashing.

Automatic dishwashing detergents are generally recognized as a class of detergent compositions distinct from those used for fabric washing or water treatment. Automatic dishwashing detergents are required to produce a spotless and film-free appearance on washed items after a complete cleaning cycle. Phosphate-free compositions rely on non-phosphate builders, such as salts of citrate, carbonate, silicate, disilicate, bicarbonate, aminocarboxylates and others to sequester calcium and magnesium from hard water, and upon drying, leave an insoluble visible deposit. Polymers of (meth)acrylic acid and of sulfonic acid monomers are known for use in automatic dishwashing systems. For example, WO2017013158A1 discloses mixtures of acrylic acid homopolymer and acrylic acid/AMPS copolymer in a detergent composition. However, this reference does not disclose the compositions of the present invention.

STATEMENT OF INVENTION

The present invention is directed to a polymer comprising a first fraction and a second fraction, wherein the first fraction comprises from 90 to 100 wt % polymerized $C_3$-$C_6$ carboxylic acid monomer units and the second fraction comprises from 30 to 80 wt % polymerized carboxylic acid monomer units and from 20 to 70 wt % polymerized sulfonic acid monomer units; wherein the first fraction is from 10 to 40 wt % of the polymer and the second fraction is from 60 to 90 wt % of the polymer; the polymer has $M_w$ from 3,000 to 30,000; and monomers are randomly distributed within each fraction.

The present invention is further directed to a method for producing a polymer; said method comprising steps of: (a) polymerizing a first monomer composition comprising from 90 to 100 wt % $C_3$-$C_6$ carboxylic acid monomer in an initial polymerization phase; and (b) polymerizing a second monomer mixture comprising from 30 to 80 wt % $C_3$-$C_6$ carboxylic acid monomer and from 20 to 70 wt % sulfonic acid monomer in a second polymerization phase; wherein a chain transfer agent is added during addition of the first and second monomer compositions.

DETAILED DESCRIPTION

All percentages are weight percentages (wt %), and all temperatures are in ° C., unless otherwise indicated. Operations are performed at room temperature (20-25° C.) unless otherwise specified. Weight average molecular weights, $M_w$, are measured by gel permeation chromatography (GPC) using polyacrylic acid standards, as is known in the art. The techniques of GPC are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. The molecular weights reported herein are in units of Daltons. As used herein the term "(meth)acrylic" refers to acrylic or methacrylic. Sulfonic acid monomers are monomers having a sulfonic acid group or its salt and having from two to eight carbon atoms. Preferred sulfonic acid monomers include, e.g., 2-acrylamido-2-methylpropane sulfonic acid (AMPS), vinyl sulfonic acid, 2-sulfoethyl acrylate, 2-sulfoethyl methacrylate, sulfopropyl acrylate, sulfopropyl methacrylate, styrene sulfonic acid, 3-allyloxy-2-hydroxy-1-propanesulfonic acid, and 2-propene-1-sulfonic acid, and salts thereof, and combinations thereof; preferably AMPS. A $C_3$-$C_6$ carboxylic acid monomer is a monomer having one or two carboxylic acid groups (preferably one) and from 3 to 6 carbon atoms. Preferably, a $C_3$-$C_6$ carboxylic acid monomer has 3 or 4 carbon atoms; preferably it is selected from the group consisting of acrylic acid (AA), methacrylic acid (MAA), maleic acid, and itaconic acid; preferably (meth)acrylic acid, preferably acrylic acid.

The term "carbonate" refers to alkali metal or ammonium salts of carbonate, bicarbonate or sesquicarbonate; the term "silicate" to alkali metal or ammonium salts of silicate, disilicate, metasilicate; and the term "citrate" to alkali metal citrates. Preferably, the carbonates, silicates or citrates are sodium, potassium or lithium salts; preferably sodium or potassium; preferably sodium. The terms "percarbonate" and "perborate" refer to alkali metal or ammonium salts of these anions, preferably potassium or sodium, preferably sodium. Weight percentages of carbonates or citrates are based on the actual weights of the salts, including metal ions. The term "phosphate-free" refers to compositions containing less than 0.5 wt % phosphate (as elemental phosphorus), preferably less than 0.2 wt %, preferably less than 0.1 wt %, preferably no detectable phosphate. Weight percentages in the detergent composition are based on the entire composition including any water that may be present.

The polymer of the present invention is produced by a multi-stage polymerization process, in which the monomer composition changes as the polymer is prepared. In the preparation, a first monomer composition is polymerized, followed by a second monomer composition. The first fraction of the polymer, as the phrase is used herein, refers to a polymer formed by the first monomers. The compositions and amounts of the first and second fractions are defined as the compositions and amounts of the first and second monomer compositions, respectively. The first and second fractions may correspond with separate first and second phases in some cases. Typically, the first stage of the polymerization is performed, optionally followed by a residual monomer reduction step to consume any unreacted monomers. The second monomer composition is then added, and polymerization is allowed to continue, preferably followed by a final residual monomer reduction step. Typically, the polymerization is a solution polymerization, preferably in an aqueous medium. Preferably, the aqueous medium is at least 75 wt % water, preferably at least 90 wt %, preferably at least 95 wt %. Preferably, the polymer is separated from the aqueous medium; preferably the polymer is from 30-65% solids, alternatively from 35-60%, alternatively from 38-57%.

Preferably, the first monomer composition comprises from 95 to 100 wt % $C_3$-$C_6$ carboxylic acid monomer, preferably 97 to 100 wt %, preferably 98 to 100 wt %, preferably 99 to 100 wt %. Preferably, the second monomer composition comprises at least 35 wt % $C_3$-$C_6$ carboxylic acid monomer, preferably at least 40 wt %, preferably at least 45 wt %, preferably at least 50 wt %; preferably no more than 75 wt %, preferably no more than 70 wt %, preferably no more than 65 wt %. Preferably, the second monomer composition comprises at least 25 wt % sulfonic acid monomer, preferably at least 30 wt %, preferably at least 35 wt %; preferably no more than 65 wt %, preferably no more than 60 wt %, preferably no more than 55 wt %, preferably no more than 50 wt %. Preferably, the second monomer composition comprises at least 35 wt % $C_3$-$C_6$ carboxylic acid monomer, preferably at least 40 wt %, preferably at least 45 wt %; preferably no more than 75 wt %, preferably no more than 70 wt %, preferably no more than 65 wt %, preferably no more than 60 wt %. Preferably, the first monomer composition is at least 13 wt % of total monomers, preferably at least 16 wt %, preferably at least 18 wt %; preferably no more than 35 wt %, preferably no more than 32 wt %, preferably no more than 29 wt %, preferably no more than 26 wt %. Preferably, the second monomer composition is at least 65 wt % of total monomers, preferably at least 68 wt %, preferably at least 71 wt %; preferably no more than 87 wt %, preferably no more than 84 wt %, preferably no more than 82 wt %. The term "total monomers" means the total amount of the first and second compositions and any other monomers used to form the polymer.

Preferably, chain transfer agent is added with monomers for at least 90% of the monomer addition time, preferably at least 95%, preferably continuously over the entire monomer addition time. Preferred chain transfer agents include, e.g., sodium metabisulfite, sodium hypophosphite, phosphorous acid, 2-mercaptoethanol, 3-mercaptopropionic acid and 1-dodecanethiol. Preferably, at least 50 wt % of the chain transfer agent is added continuously with the monomers, preferably at least 75 wt %, preferably at least 85 wt %. Preferably, the amount of chain transfer agent is from 0.1 to 25 wt % of the total mass of the first and second monomer compositions, preferably at least 0.5 wt %, preferably at least 1 wt %, preferably at least 1.5 wt %, preferably at least 2 wt %, preferably at least 2.5 wt %, preferably at least 3 wt %, preferably at least 3.5 wt %; preferably no more than 20 wt %, preferably no more than 15 wt %, preferably no more than 10 wt %, preferably no more than 8 wt %. Optionally, chain transfer agent is added using at least two rates of addition, wherein the greater of the two rates is at least twice as fast as the next fastest rate (preferably no more than ten times as fast).

A free-radical polymerization initiator is present during the polymerization, preferably in an amount from 0.1 to 10 wt % of the total mass of the first and second monomer compositions, preferably at least 0.2 wt %, preferably at least 0.25 wt %, preferably at least 0.3 wt %, preferably at least 0.35 wt %; preferably no more than 5 wt %, preferably no more than 3 wt %, preferably no more than 2.5 wt %, preferably no more than 2 wt %, preferably no more than 1.5 wt %. Preferably, at least 50 wt % of the initiator is added continuously with the monomers, preferably at least 75 wt %, preferably at least 85 wt %. Preferably, the initiator does not contain phosphorus. Preferred initiators include, e.g., sodium persulfate, potassium persulfate and ammonium persulfate.

Preferably, the first fraction of the polymer comprises from 95 to 100 wt % polymerized $C_3$-$C_6$ carboxylic acid monomer units, preferably 97 to 100 wt %, preferably 98 to 100 wt %, preferably 99 to 100 wt %. Preferably, the second fraction comprises at least 35 wt % polymerized $C_3$-$C_6$ carboxylic acid monomer units, preferably at least 40 wt %, preferably at least 45 wt %, preferably at least 50 wt %; preferably no more than 75 wt %, preferably no more than 70 wt %, preferably no more than 65 wt %, preferably no more than 60 wt %. Preferably, the second fraction comprises at least 25 wt % polymerized sulfonic acid monomer units, preferably at least 30 wt %, preferably at least 35 wt %; preferably no more than 65 wt %, preferably no more than 60 wt %, preferably no more than 55 wt %, preferably no more than 50 wt %. Preferably, the first fraction is at least 13 wt % of the polymer, preferably at least 16 wt %, preferably at least 18 wt %; preferably no more than 35 wt %, preferably no more than 32 wt %, preferably no more than 29 wt %, preferably no more than 26 wt %. Preferably, the second fraction is at least 65 wt % of the polymer, preferably at least 68 wt %, preferably at least 71 wt %; preferably no more than 87 wt %, preferably no more than 84 wt %, preferably no more than 82 wt %. Preferably, the polymer comprises at least 40 wt % polymerized $C_3$-$C_6$ carboxylic acid monomer units, preferably at least 45 wt %, preferably at least 50 wt %, preferably at least 55 wt %; preferably no more than 95 wt %, preferably no more than 90 wt %, preferably no more than 85 wt %, preferably no more than 80 wt %.

The polymer may comprise from 0 to 10 wt % of additional monomers other than $C_3$-$C_6$ carboxylic acid monomers and sulfonic acid monomers, preferably no more than 8 wt %, preferably no more than 6 wt %, preferably no more than 4 wt %, preferably no more than 2 wt %. Examples of suitable additional monomers include, e.g., $C_1$-$C_{16}$ alkyl (meth)acrylates, 2-hydroxyalkyl (meth)acrylates, vinyl alkanoates and acrylamides.

Preferably, a polymer of this invention comprises no more than 0.3 wt % polymerized units of crosslinking monomers, preferably no more than 0.1 wt %, preferably no more than 0.05 wt %, preferably no more than 0.03 wt %, preferably no more than 0.01 wt %. A crosslinking monomer is a multi-ethylenically unsaturated monomer.

Preferably, the polymer is a random copolymer. Preferably, the polymer has $M_w$ of at least 3,000, preferably at least 4,000, preferably at least 5,000; preferably no more than 30,000, preferably no more than 50,000, preferably no more than 30,000, preferably no more than 25,000, preferably no more than 20,000, preferably no more than 15,000. Preferably, the polymer has $M_n$ of at least 1,000, preferably at least 1,500, preferably at least 2,000; preferably no more than 10,000, preferably no more than 5,000, preferably no more than 4,000, preferably no more than 3,000. Preferably, $M_w/M_n$ is from 1.5 to 10, preferably at least 2, preferably at least 2.2; preferably no more than 8, preferably no more than 7, preferably no more than 6, preferably no more than 5, preferably no more than 4.

Preferably, the polymer of this invention is present in a detergent composition in an amount of at least 1 wt %, preferably at least 1.5 wt %, preferably at least 2 wt %, preferably at least 2.5 wt %, preferably at least 3 wt %, preferably at least 3.5 wt %; preferably no more than 8 wt %, preferably no more than 7.5 wt %, preferably no more than 7 wt %, preferably no more than 6.5 wt %.

The polymer may be used in combination with other polymers useful for controlling insoluble deposits in automatic dishwashers, including, e.g., polymers comprising combinations of residues of acrylic acid, methacrylic acid, maleic acid or other diacid monomers, esters of acrylic or methacrylic acid including polyethylene glycol esters, styrene monomers, AMPS and other sulfonated monomers, and substituted acrylamides or methacrylamides. Particularly useful polymers are those which are capable of improving spotting, e.g., RO-(M)$_x$-(N)$_y$—OH or R—O-(M)$_x$-(N)$_y$—(P)$_z$—OH, for which the parameters are defined herein.

Preferably, the detergent composition comprises carbonate, citrate, silicate or a combination thereof in the amount of at least 25 wt %, preferably at least 30 wt %, preferably at least 33 wt %, preferably at least 36 wt %; preferably no more than 70 wt %, preferably no more than 65 wt %, preferably no more than 60 wt %, preferably no more than 55 wt %. Preferably, the amount of carbonate is at least 5 wt %, preferably at least 10 wt %, preferably at least 15 wt %; preferably no more than 45 wt %, preferably no more than 40 wt %, preferably no more than 35 wt %, preferably no more than 30 wt %. Preferably, the amount of citrate is at least 5 wt %, preferably at least 10 wt %, preferably at least 15 wt %; preferably no more than 4 wt %, preferably no more than 35 wt %, preferably no more than 30 wt %, preferably no more than 25 wt %. Preferably, the amount of silicate is no more than 15 wt %, preferably no more than 10 wt %, preferably no more than 6 wt %, preferably no more than 4 wt %.

Preferably, the detergent composition comprises a bleaching agent, preferably percarbonate, perborate, sodium hypochlorite or trichlorocyanuric acid; preferably percarbonate or perborate; preferably percarbonate. Preferably, the amount of bleaching agent is at least 8 wt %, preferably at least 11 wt %, preferably at least 12 wt %; preferably no more than 25 wt %, preferably no more than 22 wt %, preferably no more than 20 wt %, preferably no more than 18 wt %.

The detergent composition comprises from 0.1 to 8 wt % of 1-hydroxyethanediphosphonic acid or the salt thereof; preferably at least 0.4 wt %, preferably at least 0.7 wt %, preferably at least 1 wt %, preferably at least 1.3 wt %, preferably at least 1.5 wt %; preferably no more than 6 wt %, preferably no more than 4 wt %, preferably no more than 3 wt %, preferably no more than 2.5 wt %.

Optionally, the detergent composition comprises aminocarboxylate builder(s) in an amount of at least 3 wt %; preferably at least 5 wt %, preferably at least 6 wt %, preferably at least 7 wt %, preferably at least 8 wt %; preferably no more than 40 wt %, preferably no more than 30 wt %, preferably no more than 25 wt %, preferably no more than 20 wt %, preferably no more than 15 wt %. Preferred aminocarboxylate builders include methylglycinediacetic acid (MGDA) and its salts, glutamic acid diacetic acid (GLDA) and its salts, iminodisuccinic acid (IDSA) and its salts and aspartic acid diacetic acid (ASDA) and its salts. MGDA is especially preferred.

Fillers in tablets or powders are inert, water-soluble substances, typically sodium or potassium salts, e.g., sodium or potassium sulfate and/or chloride, and typically are present in amounts ranging from 0 wt % to 70 wt %; preferably no more than 50 wt %, preferably no more than 40 wt %, preferably no more than 30 wt %, preferably no more than 20 wt %, preferably no more than 15 wt %; preferably at least 2 wt %, preferably at least 4 wt %.

Preferably, nonionic surfactants have the formula RO-$(M)_x$-$(N)_y$—H or R—O-$(M)_x$-$(N)_y$—$(P)_z$—H in which M represents polymerized units of ethylene oxide, N represents polymerized units of a $C_3$-$C_{18}$ 1,2-epoxyalkane, P represents a $C_6$-$C_{18}$-alkyl glycidyl ether, x is 5-40, y is 0-20, z is 0-3 and R represents a $C_6$-$C_{22}$ linear or branched alkyl group.

Preferably, nonionic surfactants have the formula RO-$(M)_x$-$(N)_y$—H or R—O-$(M)_x$-$(N)_y$—R' in which M and N are units derived from alkylene oxides (of which one is ethylene oxide), R represents a $C_6$-$C_{22}$ linear or branched alkyl group, and R' represents a group derived from the reaction of an alcohol precursor with a $C_6$-$C_{22}$ linear or branched alkyl halide, epoxyalkane, or glycidyl ether. Preferably, surfactants have the formula RO-$(M)_x$-H, where M represents polymerized ethylene oxide units. Preferably x is at least three, preferably at least five; preferably no more than ten, preferably no more than eight. Preferably, R and R' have at least eight carbon atoms, preferably at least ten. Preferably, the composition comprises at least 2 wt % of nonionic surfactant(s), preferably at least 3 wt %; preferably no more than 12 wt %, preferably no more than 9 wt %, preferably no more than 8 wt %.

Other components of the automatic dishwashing detergent composition may include, e.g., inorganic builders, chelating compounds, corrosion inhibitors, surfactants, oxygen and/or chlorine bleaches, bleach activators, enzymes, foam suppressants, colors, fragrances, antibacterial agents and fillers. Fillers in tablets or powders are inert, water-soluble substances, typically sodium or potassium salts, e.g., sodium or potassium sulfate and/or chloride, and typically are present in amounts ranging from 0 wt % to 70 wt %; preferably no more than 50 wt %, preferably no more than 40 wt %, preferably no more than 30 wt %, preferably no more than 20 wt %, preferably no more than 15 wt %; preferably at least 2 wt %, preferably at least 4 wt %. Fillers in gel formulations may include those mentioned above and also water. Fragrances, dyes, foam suppressants, enzymes and antibacterial agents usually total no more than 5 wt % of the composition.

Preferably, the detergent composition has a pH (at 1 wt % in water) of at least 8.5, preferably at least 9.5; in some embodiments the pH is no greater than 12.

The composition can be formulated in any typical form, e.g., as a tablet, powder, monodose, sachet, paste, liquid or gel. The composition can be used under typical operating conditions for any typical automatic dishwasher. Typical water temperatures during the washing process preferably are from 20° C. to 85° C., preferably from 30° C. to 70° C. Typical concentrations for the composition as a percentage of total liquid in the dishwasher preferably are from 0.1 to 1 wt %, preferably from 0.2 to 0.7 wt %. With selection of an appropriate product form and addition time, the composition may be present in the prewash, main wash, penultimate rinse, final rinse, or any combination of these cycles.

EXAMPLES

Synthesis
Synthesis of Polymer C1

To a round-bottom flask equipped with thermocouple, overhead stirrer, reflux condenser and ports for the introduction of liquid reagents were charged 206 g deionized water (DI) and 2.5 g of a 0.15 wt % solution of ferrous sulfate. The mixture was heated with stirring to 73° C., at which point a solution of sodium metabisulfite (0.84 g in 5.25 g DI) was added all at once. Then, feed of a mixture of acrylic acid (240 g) and AMPS sodium salt (120 g of a 50 wt % aqueous solution) was initiated and proceeded at a rate of 4 g/min until exhausted (90 min). Beginning at the same time, a feed of sodium persulfate solution (0.96 g in 30 g DI) was started and continued to exhaustion (95 min). Also beginning at the same time, a feed of sodium metabisulfite (19.43 g in 45 g DI) was started and continued to exhaustion (80 min). After the completion of the longest feed (initiator), the reaction was held at 73° C. for 10 min, followed by the addition of a chase of sodium persulfate solution (0.39 g in 7 g DI) over 10 min, followed by another hold for 20 min. The reaction mixture was allowed to cool, and during this phase the reaction mixture was partially neutralized by the addition of 75 g of a 50 wt % solution of sodium hydroxide. A shot of hydrogen peroxide (4.8 g of a 35 wt % solution) was then added to help reduce residual sulfite. Next the neutralization was completed by the addition of another 150 g of sodium hydroxide 50%. The polymer was decanted, rinsed with 30 g DI, and analyzed after cooling. Solid content (wt %): 41.66; pH=6.1; residual AA<17 ppm; Mw/1000=6.7; Mn/1000=2.5.

Synthesis of Polymer 1

The polymerization reactor described in C1 was charged with 206 g deionized water (DI) and 2.5 g of a 0.15 wt % solution of ferrous sulfate. The mixture was heated with stirring to 73° C., at which point a solution of sodium metabisulfite (0.84 g in 5.25 g DI) was added. Acrylic acid (240 g) feed was started at this point at a rate of 2.667 g/min until exhausted (90 min). Beginning at the same time, a feed of sodium persulfate solution (0.96 g in 30 g DI) was started and continued to exhaustion (95 min). Also beginning at the same time, a feed of sodium metabisulfite (19.43 g in 45 g DI) was started and continued to exhaustion (80 min). Thirty minutes after the initiation of the concurrent feeds of AA, sodium persulfate, and sodium metabisulfite, the feed of AMPS sodium salt (120 g of a 50 wt % aqueous solution) was started and proceeded at a rate of 2 g/min until exhaustion (60 min). After the completion of the sodium persulfate feed, the reaction was held at 73° C. for 10 min, followed by the addition of a chase of sodium persulfate solution (0.39 g in 5.2 g DI) over 10 min, followed by another hold for 20 min. The reaction mixture was allowed to cool, and during this phase the reaction mixture was partially neutralized by the addition of 75 g of a 50 wt % solution of sodium hydroxide. A shot of hydrogen peroxide (7.25 g of a 35 wt % solution) was then added. Next the neutralization was completed by the addition of another 150 g of sodium hydroxide 50%. The polymer was decanted, rinsed with 30 g DI, and analyzed after cooling. Solid content (wt %): 42.03; pH=6.1; residual AA<17 ppm; Mw/1000=6.3; Mn/1000=2.4.

Synthesis of Polymer 2

The polymerization reactor described in C1 was charged with 206 g deionized water (DI) and 2.5 g of a 0.15 wt % solution of ferrous sulfate. The mixture was heated with stirring to 73° C., at which point a solution of sodium metabisulfite (0.84 g in 5.25 g DI) was added. Acrylic acid (240 g) feed was started at this point at a rate of 2.667 g/min until exhausted (90 min). Beginning at the same time, a feed of sodium persulfate solution (0.96 g in 30 g DI) was started and continued to exhaustion (95 min). Also beginning at the same time, a feed of sodium metabisulfite (19.43 g in 45 g DI) was started at a rate of 1.87 mL/min and continued at this rate for 20 min, at which point the rate was reduced to 0.21 mL/min for 60 min. Thirty minutes after the initiation of the concurrent feeds of AA, sodium persulfate, and sodium metabisulfite, the feed of AMPS sodium salt (120 g of a 50 wt % aqueous solution) was started and proceeded at a rate of 2 g/min until exhaustion (60 min). After the completion of the sodium persulfate feed, the reaction was held at 73° C. for 10 min, followed by the addition of a chase of sodium persulfate solution (0.39 g in 5.2 g DI) over 10 min, followed by another hold for 20 min. The reaction mixture was allowed to cool, and during this phase the reaction mixture was partially neutralized by the addition of 75 g of a 50 wt % solution of sodium hydroxide. A shot of hydrogen peroxide (5.4 g of a 35 wt % solution) was then added. Next the neutralization was completed by the addition of another 150 g of sodium hydroxide 50%. The polymer was decanted, rinsed with 30 g DI, and analyzed after cooling. Solid content (wt %): 42.37; pH=6.2; residual AA<16 ppm; Mw/1000=10.5; Mn/1000=2.4.

Synthesis of Polymer 3

The polymerization reactor described in C1 was charged with 206 g deionized water (DI) and 2.5 g of a 0.15 wt % solution of ferrous sulfate. The mixture was heated with stirring to 73° C., at which point a solution of sodium metabisulfite (0.84 g in 5.25 g DI) was added. Acrylic acid (240 g) feed was started at this point at a rate of 2.667 g/min until exhausted (90 min). Beginning at the same time, a feed of sodium persulfate solution (0.96 g in 30 g DI) was started and continued to exhaustion (95 min). Also beginning at the same time, a feed of sodium metabisulfite (19.43 g in 45 g DI) was started at a rate of 0.93 mL/min and continued at this rate for 40 min, at which point the rate was reduced to 0.32 mL/min for 40 min. Thirty minutes after the initiation of the concurrent feeds of AA, sodium persulfate, and sodium metabisulfite, the feed of AMPS sodium salt (120 g of a 50 wt % aqueous solution) was started and proceeded at a rate of 2 g/min until exhaustion (60 min). After the completion of the sodium persulfate feed, the reaction was held at 73° C. for 10 min, followed by the addition of a chase of sodium persulfate solution (0.39 g in 5.2 g DI) over 10 min, followed by another hold for 20 min. The reaction mixture was allowed to cool, and during this phase the reaction mixture was partially neutralized by the addition of 75 g of a 50 wt % solution of sodium hydroxide. A shot of hydrogen peroxide (4.7 g of a 35 wt % solution) was then added. Next the neutralization was completed by the addition of another 150 g of sodium hydroxide 50%. The polymer was decanted, rinsed with 30 g DI, and analyzed after cooling. Solid content (wt %): 42.25; pH=6.2; residual AA<22 ppm; Mw/1000=7.2; Mn/1000=2.3.

Formulation for Autodishwashing (ADW) Tests:

Total formulation weight: 20 g.

| Ingredient | Weight % (as solid material) |
|---|---|
| Sodium citrate | 30 |
| Sodium carbonate | 25 |
| Sodium disilicate | 2 |
| Sodium percarbonate | 15 |
| Tetraacetyl ethylenediamine (TAED) | 4 |
| Non-ionic surfactant* | 5 |
| Dispersant polymer | 5 |
| Protease** | 2 |
| Amylase*** | 1 |
| 1-hydroxyethanediphosphonic acid, sodium salt (HEDP)**** | 2 |
| Sodium sulfate (filler) | 9 |

*DOWFAX™ 20B102, available from The Dow Chemical Company;
**Savinase® 12T, available from Novozymes;
***Stainzyme® 12T, available from Novozymes;
****Dequest® 2016DG, available from Italmatch Chemicals.

ADW 30-Cycle Build-Up Performance Test

Miele G1222 SC machines were run at 65° C., 30 min cycle with prewash, with French water hardness 37°, Ca:Mg=3:1, temporary hardness (French) 25° with ballast load of porcelain, glass, and cutlery. Food soil (50 g, see table below) was added frozen. Ratings were performed by trained panelist observing glasses lit from below in a light-box in a dark room and range from 1 (no filming or spotting) to 5 (heavily filmed or spotted).

Food Soil:

| Ingredients | Quantity needed to prepare 3 L |
|---|---|
| Water | 2.1 L |
| Margarine | 300 g |
| Potato starch | 15 g |
| Instant gravy | 75. g |
| Benzoic acid | 3 g |
| Milk | 150 g |
| Egg yolk | 9 (about 162 g) |

-continued

| Ingredients | Quantity needed to prepare 3 L |
|---|---|
| Ketchup | 75 g |
| Mustard | 75 g |

Filming and Spotting Ratings:

| Rating type | Polymer C1 | Polymer 1 | Polymer 2 | Polymer 3 | pAA + AA/AMPS* |
|---|---|---|---|---|---|
| Filming | 2 | 1.5 | 1.5 | 1.5 | 2 |
| Spotting | 4 | 2 | 2.5 | 2 | 1.5 |

ADW 5-Cycle Rinse Performance Test

Miele G1223 SC L2 machines were run at 50° C., 8 min cycle, with French water hardness 37°, Ca:Mg=3:1, temporary hardness (French) 25° with ballast load of porcelain, glass, and cutlery. Food soil (50 g, same as for Build-up Test) was added frozen. Ratings were performed by trained panelist observing glasses lit from below in a lightbox in a dark room and range from 1 (no filming or spotting) to 5 (heavily filmed or spotted).

Filming and Spotting Ratings:

| Rating type | Polymer C1 | Polymer 1 | Polymer 2 | Polymer 3 | pAA + AA/AMPS* |
|---|---|---|---|---|---|
| Filming | 1 | 1.5 | 1.5 | 1 | 1 |
| Spotting | 4.5 | 4.5 | 4.5 | 4.5 | 4.5 |

The invention claimed is:

1. A method for producing a random copolymer; said method comprising steps of: (a) polymerizing a first monomer composition comprising from 90 to 100 wt % $C_3$-$C_6$ carboxylic acid monomer in an initial polymerization phase; and (b) polymerizing a second monomer composition comprising from 30 to 80 wt % $C_3$-$C_6$ carboxylic acid monomer and from 20 to 70 wt % sulfonic acid monomer in a second polymerization phase; wherein a chain transfer agent is added during addition of the first and second monomer compositions; and wherein the chain transfer agent is added with monomers continuously over the entire monomer addition time.

2. The method of claim 1 in which the sulfonic acid monomers are selected from the group consisting of 2-acrylamido-2-methylpropane sulfonic acid, vinyl sulfonic acid, 2-sulfoethyl acrylate, 2-sulfoethyl methacrylate, sulfopropyl acrylate, sulfopropyl methacrylate, styrene sulfonic acid, 3-allyloxy-2-hydroxy-1-propanesulfonic acid, and 2-propene-1-sulfonic acid, and salts thereof, and combinations thereof.

3. The method of claim 2 in which the first monomer composition comprises from 95 to 100 wt % (meth)acrylic acid; and the second monomer composition comprises from 40 to 70 wt % (meth)acrylic acid and from 30 to 60 wt % sulfonic acid monomer.

4. The method of claim 3 in which the first monomer composition is from 13 to 32 wt % of total monomers and the second monomer composition is from 68 to 87 wt % of total monomers.

5. The method of claim 4 in which free radical polymerization initiator is added in an amount from 0.1 to 5 wt % of the total mass of the first and second monomer compositions, and at least 50 wt % of the initiator is added continuously with the monomers.

6. The method of claim 1, wherein the chain transfer agent is selected from the group consisting of sodium metabisulfite, sodium hypophosphite, phosphorous acid, 2-mercaptoethanol, 3-mercaptopropionic acid and 1-dodecanethiol.

* * * * *